United States Patent
Cudak et al.

(10) Patent No.: US 9,426,057 B2
(45) Date of Patent: Aug. 23, 2016

(54) DATA RE-ROUTING FOR SPECIFIC END USER AVOIDANCE

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/101,900

(22) Filed: Dec. 10, 2013

(65) Prior Publication Data

US 2015/0163128 A1 Jun. 11, 2015

(51) Int. Cl.
*H04L 12/707* (2013.01)
*H04L 12/721* (2013.01)

(52) U.S. Cl.
CPC .............. *H04L 45/22* (2013.01); *H04L 45/70* (2013.01)

(58) Field of Classification Search
CPC ......... H04L 45/06; H04L 45/22; H04L 45/40; H04L 45/70
See application file for complete search history.

(56) References Cited

U.S. PATENT DOCUMENTS

| 7,043,529 | B1* | 5/2006 | Simonoff | H04L 67/02 709/204 |
| 8,799,053 | B1* | 8/2014 | Goldberg | G06F 21/6254 705/7.29 |
| 2008/0112335 | A1* | 5/2008 | Grimminger | H04L 45/00 370/254 |
| 2009/0279677 | A1* | 11/2009 | Chavez | H04M 3/54 379/93.02 |
| 2011/0275367 | A1* | 11/2011 | Citron | H04W 60/005 455/432.1 |
| 2014/0282102 | A1* | 9/2014 | Avrahami | H04W 4/00 715/753 |

* cited by examiner

*Primary Examiner* — Michael C Lai
(74) *Attorney, Agent, or Firm* — Steven M. Greenberg, Esq.; CRGO Law

(57) ABSTRACT

Embodiments of the present invention provide a method, system and computer program product for data routing alteration to avoid a specified end user. In an embodiment of the invention, a method for data re-routing for specific end user avoidance includes receiving a request to route a file to a primary location and identifying an end user excluded from accessing the document. The method also includes computing a likelihood that the excluded end user may contemporaneously access the primary location. Finally, the method includes responding to a determination that the excluded end user is likely to contemporaneously access the primary location by taking corrective measures to re-route the file to an alternate location.

12 Claims, 1 Drawing Sheet

DATA RE-ROUTING FOR SPECIFIC END USER AVOIDANCE

BACKGROUND OF THE INVENTION

1. Field of the Invention

The present invention relates to data security and more particularly to data routing to implement data security.

2. Description of the Related Art

Data security refers to the assurance that data in a computing system remains accessible only by those authorized to access the data. Data takes the form of an electronic collection of symbols in memory, or in fixed storage in the form of a document, or affixed to a printed medium such as paper. In its most basic form, data security involves the authentication of individuals seeking access to data or to a storage location or application through which data can be accessed. More advanced forms of security implement restrictive or permissive policies which can dictate which individuals or types of individuals may not access data, or which individuals or types of individuals may access the data, as the case may be.

Data security in respect to printing data to printed document form generally is a manual process in which only authorized individuals are permitted to access the physical location of the printer. Data security in respect to storing data in a document is more sophisticated in that the document location is restricted for access only by authorized end users of a particular identity or role which is enforced through computerized authentication. In either circumstance, however, it remains the case that though authorized to access data, in certain circumstances it is desirable to restrict access to particular data from particular end users on a case-by-case basis.

More particularly, occasionally there exist files, print jobs and other types of data which, on a security level, may be open to a group of users. For instance, a network disk drive or printer may allow all users from one or more departments to store files or to accept print jobs. Current security means allows limiting users by such groups, but in some cases it may be desirable to ensure specific other users may not encounter certain documents or files. Administrators currently handle such unique circumstances at a high level, but some user power is needed in further limiting access to data without requiring the intervention of an administrator.

Reasons to avoid a particular end user may include printing or storing documents containing information addressing the nature, actions, performance or character of a end user, or printing or storing documents containing information addressing sensitive topics affecting the subject end user such as human resources concerns. While the subject end user may technically fall within security level for accessing the document, it may not be in the best interest for the organization for the subject end user to access the information.

BRIEF SUMMARY OF THE INVENTION

Embodiments of the present invention address deficiencies of the art in respect to document security and provide a novel and non-obvious method, system and computer program product for data routing alteration to avoid a specified end user. In an embodiment of the invention, a method for data re-routing for specific end user avoidance includes receiving a request to route a file to a primary location and identifying an end user excluded from accessing the file. The method also includes computing a likelihood that the excluded end user may contemporaneously access the primary location. Finally, the method includes responding to a determination that the excluded end user is likely to contemporaneously access the primary location by taking corrective measures to re-route the file to an alternate location.

In one aspect of the embodiment, the excluded end user is identified by parsing the file to recognize a reference to the excluded end user. In another aspect of the embodiment, the likelihood is computed based upon the contemporaneous existence of a print job in a print queue of a primary printer where the primary printer is the primary location. In yet another aspect of the embodiment, the likelihood is computed based upon the presence of a contemporaneously stored file of the excluded end user at a primary file repository, where the primary file repository is the primary location.

In another embodiment of the invention, a data processing system is configured for data re-routing for specific end user avoidance. The system includes a host computing system that includes at least one computer with memory and at least one processor. The host computing system is communicatively coupled to different client computers over a computer communications network. The system also includes a primary location and an alternate location, each receiving files routed thereto by different ones of the client computers. Finally, the system includes a re-routing module executing in the memory of the host computing system. The module includes program code enabled upon execution to receive a request to route a file to the primary location, to identify an end user excluded from accessing the file, to compute a likelihood that the excluded end user may contemporaneously access the primary location, and to respond to a determination that the excluded end user is likely to contemporaneously access the primary location by taking corrective measures to re-route the file to the alternate location. In one aspect of the embodiment, the primary location is a primary printer and the alternate location is an alternate printer. In another aspect of the embodiment, the primary location is a primary file repository and the alternate location is an alternate file repository.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data re-routing for specific end user avoidance. In accordance with an embodiment of the invention, a file such as a document is selected for routing to a particular location, such as a particular file location or repository, or a particular display or printing device. A subject end user can be specified to disallow access to the file. Thereafter, a likelihood of the end user accessing the particular location can be computed and if it is determined that the end user is permitted to and likely to access the particular location, a corrective measure can be triggered. The corrective measure can include, by way of example, alerting the file author, identifying an alternate location and recommending the alternate location to the file author with an alert, automatically re-routing the file to the alternate location, or delaying routing of the file until a time when it is less likely the subject end user will access the particular location.

Figure 1:
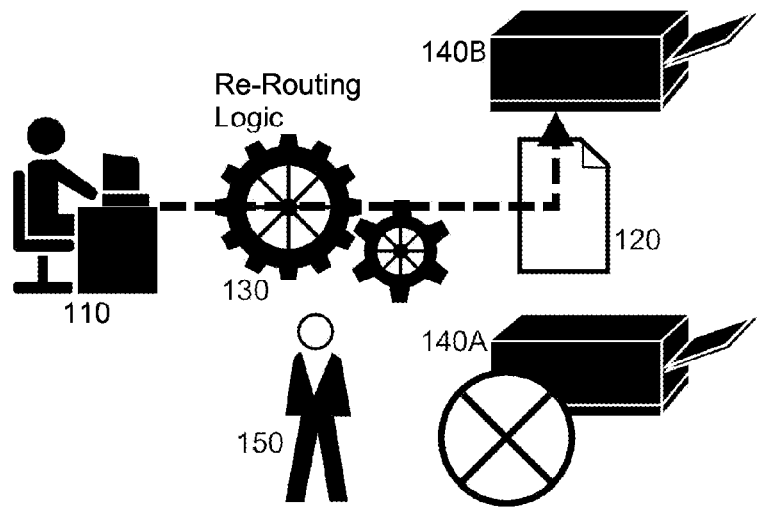
FIG. 1 is a pictorial illustration of a process for data re-routing for specific end user avoidance.

In further illustration, FIG. 1 pictorially shows a process for data re-routing for specific end user avoidance. As shown in FIG. 1, an end user 110 can direct routing of a file 120 to a primary location 140A, for instance a printer or a file repository. An excluded user 150 can be determined for the file 120, for example by direct specification in the directive to route the file 120, or by implicit specification based upon a context of the file 120, including a reference in the file 120 to the excluded end user 150, or a subject of the file 120 associated with the excluded end user 150.

Re-routing logic 130 can determined whether or not the excluded end user 150 is likely to access the primary location 140A. In this regard, one or more past instances of the excluded end user 150 accessing the primary location 140A can indicate the likelihood that the excluded end user 150 may contemporaneously access the primary location 140A. Also, a physical proximity of the excluded end user 150 to the primary location 140A—for example as detected by an RFID tag—can indicate a likelihood that the excluded end user 150 may contemporaneously access the primary location 140A. Even further, a file associated with the excluded end user 150 presently existent at the primary location 140A can indicate a likelihood that the excluded end user 150 may contemporaneously access the primary location 140A.

Based upon a determination by the re-routing logic 130 that it is likely that the excluded end user 150 may contemporaneously access the primary location 140A, the re-routing logic 130 can take corrective measures. Examples of corrective measures include prompting the end user 110 of the need to re-route the file 120 to an alternate location 140B, the automatic re-routing of the file 120 to the alternate location 140B, or the delay of the routing of the file 120 to the primary location 140A until a time during which it is less likely that the excluded end user 150 will access the primary location 140A.

Figure 2:
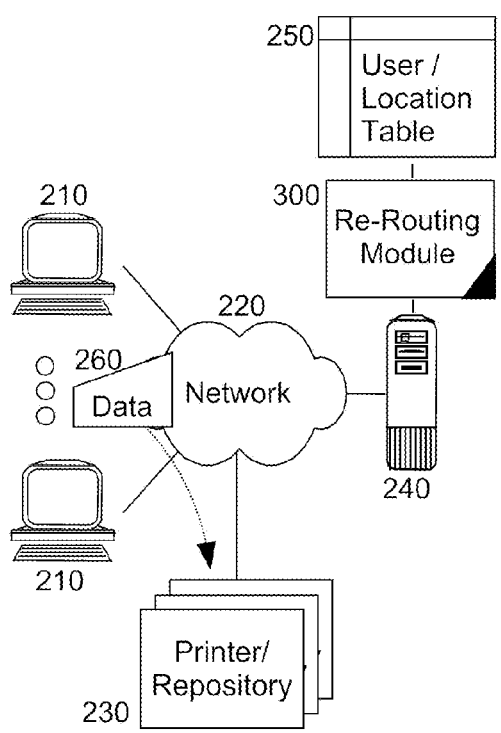
FIG. 2 is a schematic illustration of a data processing system configured for data re-routing for specific end user avoidance; and, FIG. 3 is a flow chart illustrating a process for data re-routing for specific end user avoidance.

The process described in connection with FIG. 1 can be implemented in a data processing system. In more particular illustration, FIG. 2 schematically shows a data processing system configured for data re-routing for specific end user avoidance. The system can include a host computing system 240 that includes one or more computers, each with memory and one or more processors. The host computing system 240 can be communicatively coupled over computer communications network 220 to one or more client computers 210 issuing requests to route data 260 to primary locations 230—namely printers or file repositories.

Re-routing module 300 can execute in the memory of the host computing system 240. The re-routing module 300 can include program code enabled upon execution in the memory of the host computing system 240 to process a request to route data 260 to a primary one of the locations 230 by identifying an excluded end user and computing a likelihood that the excluded end user may contemporaneously access the primary one of the locations 230. For example, the re-routing module 300 can consult a user-location table 250 to identify a pre-determined likelihood that the excluded end user is likely to contemporaneously access the primary one of the locations 230. Alternatively, the re-routing module 300 can dynamically compute the likelihood that the excluded end user may contemporaneously access the primary one of the locations 230.

To the extent that it is determined that the excluded end user may contemporaneously access the primary one of the locations 230, the program code of the re-routing module 300 can undertake remedial measures. Examples of remedial measures include issuing a prompt recommending the re-routing the document data 260 to an alternate one of the locations 230, automatically re-routing the data 260 to an alternate one of the locations 230, or delaying the routing of the data 260 to the primary one of the locations 230 until a time during which it is less likely that the excluded end user will access the primary one of the locations 230.

Figure 3:
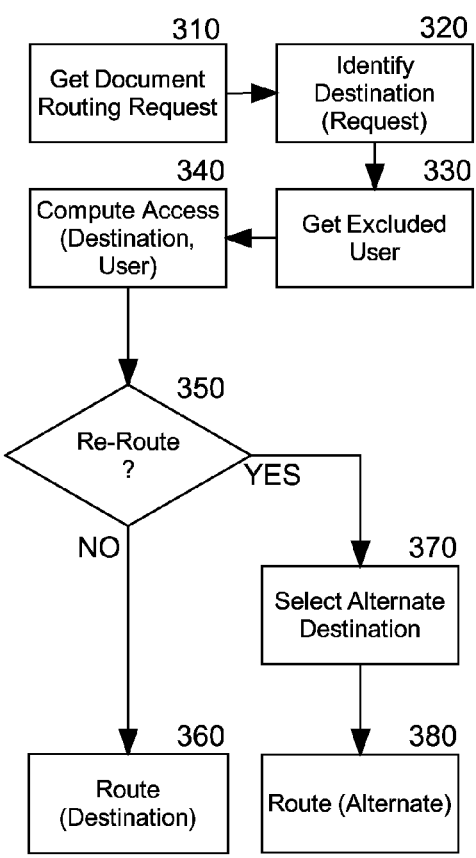

In yet further illustration of the operation of the re-routing module 300, FIG. 3 is a flow chart illustrating a process for data re-routing for specific end user avoidance. Beginning in block 310, a file routing request can be received. In block 320, a primary location, such as a printer or a file repository, can be determined from the request and in block 330, an excluded end user can be identified. For instance, the excluded user can be determined manually by selecting from a directory an end user to be excluded. Alternatively, the excluded user can be identified as specified from within the request or from within the file. As yet another alternative, the excluded user can be determined dynamically by parsing the content of the file to identify a reference to the excluded end user, to identify a subject or topic of the message for which the excluded end user is to be restricted, or by correlating one or more keywords as an indication of excluding a particular end user.

In block 340, it further can be computed whether or not it is likely that the excluded end user may contemporaneously access the primary location. For example, the likelihood can be computed based upon the contemporaneous existence of a print job in a print queue of the location, by the presence of a contemporaneously stored file of the excluded end user at the primary location, by a past history or recent usage of the location by the excluded end user, or by presence detection of the excluded end user at a printer of the location. In decision block 350, it can be determined whether or not to re-route the document to an alternate location based upon a determination that the excluded end user is likely to contemporaneously access the primary location. If note, in block 360 the file can be routed to the primary location. Otherwise, in block 370 an alternate location can be selected and in block 380, the file can be routed to the alternate location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for data re-routing for specific end user avoidance comprising:

receiving a request to route a file to a primary location comprising a primary printer;

identifying an end user excluded from accessing the file;

computing a likelihood that the excluded end user may contemporaneously access the primary location based upon a contemporaneous existence of a print job in a print queue of the primary printer; and, responsive to a computation of a likelihood that the excluded end user may contemporaneously access the primary location, taking corrective measures to re-route the file to an alternate location comprising an alternate printer.

2. The method of claim 1, wherein the primary location is a primary file repository and the alternate location is an alternate file repository.

3. The method of claim 2, wherein the likelihood is computed based upon the presence of a contemporaneously stored file of the excluded end user at the primary file repository.

4. The method of claim 1, wherein the excluded end user is identified by parsing the file to recognize a reference to the excluded end user.

5. A data processing system configured for data re-routing for specific end user avoidance, the system comprising:

a host computing system comprising at least one computer with memory and at least one processor, the host computing system being communicatively coupled to different client computers over a computer communications network;

a primary location comprising a primary printer and an alternate location comprising an alternate printer, each receiving files routed thereto by different ones of the client computers; and, a re-routing module executing in the memory of the host computing system, the module comprising program code enabled upon execution to receive a request to route a file to the primary location, to identify an end user excluded from accessing the file, to compute a likelihood that the excluded end user may contemporaneously access the primary location based upon a contemporaneous existence of a print job in a print queue of the primary printer, and to respond to a computation of a likelihood that the excluded end user may contemporaneously access the primary location by taking corrective measures to re-route the file to the alternate location.

6. The system of claim 5, wherein the primary location is a primary file repository and the alternate location is an alternate file repository.

7. The system of claim 6, wherein the likelihood is computed based upon the presence of a contemporaneously stored file of the excluded end user at the primary file repository.

8. The system of claim 5, wherein the excluded end user is identified by parsing the file to recognize a reference to the excluded end user.

9. A computer program product for data re-routing for specific end user avoidance, the computer program product comprising:

a non-transitory computer readable storage medium having computer readable program code embodied therewith, the computer readable program code comprising:

computer readable program code for receiving a request to route a file to a primary location comprising a primary printer;

computer readable program code for identifying an end user excluded from accessing the file;

computer readable program code for computing a likelihood that the excluded end user may contemporaneously access the primary location based upon a contemporaneous existence of a print lob in a print queue of the primary printer; and, computer readable program code for responding to a computation of a likelihood that the excluded end user may contemporaneously access the primary location by taking corrective measures to re-route the file to an alternate location comprising an alternate printer.

10. The computer program product of claim 9, wherein the primary location is a primary file repository and the alternate location is an alternate file repository.

11. The computer program product of claim 10, wherein the likelihood is computed based upon the presence of a contemporaneously stored file of the excluded end user at the primary file repository.

12. The computer program product of claim 9, wherein the excluded end user is identified by parsing the file to recognize a reference to the excluded end user.

* * * * *